(12) United States Patent
Zhang et al.

(10) Patent No.: US 11,506,039 B2
(45) Date of Patent: Nov. 22, 2022

(54) FRACTURING DEVICE, FIREFIGHTING METHOD THEREOF AND COMPUTER READABLE STORAGE MEDIUM

(71) Applicant: YANTAI JEREH PETROLEUM EQUIPMENT & TECHNOLOGIES CO., LTD., Shandong (CN)

(72) Inventors: Peng Zhang, Shandong (CN); Rikui Zhang, Shandong (CN); Liang Lv, Shandong (CN); Xiaolei Ji, Shandong (CN); Chunqiang Lan, Shandong (CN); Yipeng Wu, Shandong (CN); Xincheng Li, Shandong (CN); Yuxuan Sun, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/517,369

(22) Filed: Nov. 2, 2021

(65) Prior Publication Data

US 2022/0235641 A1 Jul. 28, 2022

Related U.S. Application Data

(63) Continuation-in-part of application No. 17/398,375, filed on Aug. 10, 2021, which is a continuation of
(Continued)

(30) Foreign Application Priority Data

Jan. 26, 2021 (CN) .......................... 202110101567.8

(51) Int. Cl.
*E21B 43/26* (2006.01)
*E21B 35/00* (2006.01)
(Continued)

(52) U.S. Cl.
CPC .......... *E21B 43/2607* (2020.05); *E21B 35/00* (2013.01); *E21B 43/26* (2013.01);
(Continued)

(58) Field of Classification Search
CPC ....... E21B 43/26; E21B 43/2607; E21B 35/00
See application file for complete search history.

(56) References Cited

U.S. PATENT DOCUMENTS 5,195,593 A * 3/1993 Cassin .................... E21B 35/00
169/69
5,275,244 A * 1/1994 Da Silva .................. A62C 3/06
169/69

(Continued)

FOREIGN PATENT DOCUMENTS

| CN | 207752603 U | 8/2018 |
| CN | 110005085 A | 7/2019 |
| CN | 110485983 A | 11/2019 |

*Primary Examiner* — Shane Bomar
(74) *Attorney, Agent, or Firm* — Crowell & Moring LLP

(57) ABSTRACT

A fracturing device, a firefighting method thereof, and a computer readable storage medium are disclosed. The fracturing device includes a power unit, the power unit includes a muffling compartment, a turbine engine, and a firefighting system; the firefighting system includes a firefighting material generator, at least one firefighting sprayer and at least one firefighting detector, the at least one firefighting sprayer and the at least one firefighting detector are located in the muffling compartment, each of the at least one firefighting sprayer is connected with the firefighting material generator and configured to spray out firefighting material generated by the firefighting material generator.

17 Claims, 8 Drawing Sheets

Related U.S. Application Data application No. 17/172,819, filed on Feb. 10, 2021, now Pat. No. 11,143,006.

(51) Int. Cl.

| | | |
|---|---|---|
| *F02C 7/06* | (2006.01) | |
| *F02C 7/24* | (2006.01) | |
| *F02C 7/32* | (2006.01) | |
| *F16N 7/00* | (2006.01) | |
| *A62C 35/00* | (2006.01) | |
| *F01M 1/00* | (2006.01) | |
| *F01M 5/00* | (2006.01) | |

(52) U.S. Cl.
CPC .................. *F02C 7/06* (2013.01); *F02C 7/24* (2013.01); *F02C 7/32* (2013.01); *A62C 35/00* (2013.01); *F01M 1/00* (2013.01); *F01M 5/002* (2013.01); *F05D 2260/98* (2013.01); *F16N 7/00* (2013.01)

(56) References Cited

U.S. PATENT DOCUMENTS

| | | | | |
|---|---|---|---|---|
| 5,299,646 A | * | 4/1994 | Courtney | ................ E21B 35/00 |
| | | | | 169/69 |
| 9,052,037 B2 | * | 6/2015 | Novotny | ................ B65H 59/10 |
| 9,540,907 B1 | * | 1/2017 | du Plessis | ................ A62C 3/06 |
| 10,407,990 B2 | | 9/2019 | Oehring | |
| 10,865,624 B1 | | 12/2020 | Cui | |
| 10,865,631 B1 | | 12/2020 | Zhang | |
| 10,954,855 B1 | | 3/2021 | Ji | |
| 10,961,993 B1 | | 3/2021 | Ji | |
| 11,415,056 B1 | * | 8/2022 | Yeung | ........................ F02C 7/24 |
| 2003/0146004 A1 | * | 8/2003 | Cicanese | ................... A62C 3/02 |
| | | | | 169/13 |
| 2008/0251263 A1 | * | 10/2008 | Hamdy | .................... A62C 3/06 |
| | | | | 169/69 |
| 2012/0227983 A1 | * | 9/2012 | Lymberopoulos | ........................... |
| | | | | F16K 31/1262 |
| | | | | 166/373 |
| 2014/0048268 A1 | | 2/2014 | Chandler | |
| 2018/0266412 A1 | | 9/2018 | Stokkevag et al. | |
| 2020/0206651 A1 | | 7/2020 | Frick | |
| 2020/0332784 A1 | | 10/2020 | Zhang | |
| 2020/0400005 A1 | | 12/2020 | Han | |
| 2021/0071579 A1 | | 3/2021 | Li | |
| 2021/0086851 A1 | | 3/2021 | Zhang | |
| 2021/0087883 A1 | | 3/2021 | Zhang | |
| 2021/0087916 A1 | | 3/2021 | Zhang | |
| 2021/0088042 A1 | | 3/2021 | Zhang | |
| 2021/0388760 A1 | * | 12/2021 | Feng | ........................ F02C 6/00 |
| 2022/0090476 A1 | * | 3/2022 | Zhang | .................... E21B 43/26 |

\* cited by examiner

FRACTURING DEVICE, FIREFIGHTING METHOD THEREOF AND COMPUTER READABLE STORAGE MEDIUM

CROSS REFERENCE TO RELATED APPLICATIONS

For all purposes, this application is a continuation in part of U.S. Ser. No. 17/398,375 filed on Aug. 10, 2021, which is a continuation of U.S. Ser. No. 17/172,819 filed on Feb. 10, 2021 which claims priority of Chinese Patent Application No. 202110101567.8, filed on Jan. 26, 2021, the disclosure of these applications is incorporated herein by reference in its entirety as part of the present application.

TECHNICAL FIELD

Embodiments of the present invention relates to a fracturing device, a firefighting method thereof and a computer readable storage medium.

BACKGROUND

In recent years, with increasing demand for unconventional gases such as shale gas, the demand for fracturing facilities is increasing significantly. A fracturing device typically comprises a main power unit and a plurality of auxiliary power units as well as some supporting units. Such units are generally arranged transversely with a large size, which would not be convenient to transport. How to design a fracturing facility having a small size and a compact structure for the convenience of transportation in bad conditions such as in remote mountain areas is a crucial problem demanding prompt solution for those skilled in the art.

SUMMARY

At least one embodiment of the present disclosure provides a fracturing device, including a power unit, the power unit includes a muffling compartment, a turbine engine, and a firefighting system; the firefighting system includes a firefighting material generator, at least one firefighting sprayer and at least one firefighting detector, the at least one firefighting sprayer and the at least one firefighting detector are located in the muffling compartment, each of the at least one firefighting sprayer is connected with the firefighting material generator and configured to spray out firefighting material generated by the firefighting material generator.

For example, in the fracturing device provided by an embodiment of the present disclosure, the firefighting system further includes: a controller, being in a communication connection with the at least one firefighting detector and the firefighting material generator, and configured to trigger the firefighting material generator to generate the firefighting material according to information detected by the at least one firefighting detector.

For example, in the fracturing device provided by an embodiment of the present disclosure, the at least one firefighting detector includes one or more selected from the group consisting of a temperature detector, a smoke detector, a flame detector, and a combustible gas detector.

For example, in the fracturing device provided by an embodiment of the present disclosure, the combustible gas detector includes a methane detector.

For example, in the fracturing device provided by an embodiment of the present disclosure, the at least one firefighting detector includes an engine temperature detector, located on a top of the muffling compartment and above the turbine engine; the engine temperature detector is configured to detect a temperature of the turbine engine.

For example, in the fracturing device provided by an embodiment of the present disclosure, the power unit further includes a deceleration mechanism, the deceleration mechanism is connected with the turbine engine and located in the muffling compartment; the at least one firefighting detector includes a muffling compartment temperature detector, located on a top of the muffling compartment and above the deceleration mechanism, the muffling compartment temperature detector is configured to detect a temperature of the deceleration mechanism.

For example, in the fracturing device provided by an embodiment of the present disclosure, the firefighting material generator is located outside the muffling compartment.

For example, in the fracturing device provided by an embodiment of the present disclosure, the firefighting material includes aerosol or dry ice.

For example, in the fracturing device provided by an embodiment of the present disclosure, the firefighting system further includes: an alertor, configured to send out at least one of alerting sound and alerting light.

For example, in the fracturing device provided by an embodiment of the present disclosure, the firefighting system further includes: a hand fire extinguisher, located outside the muffling compartment.

For example, in the fracturing device provided by an embodiment of the present disclosure, the hand fire extinguisher includes a dry powder fire extinguisher.

At least one embodiment of the present disclosure further provides a firefighting method of the fracturing device, which includes: periodically detecting firefighting information of the muffling compartment by using the at least one firefighting detector; judging whether there is a fire in the muffling compartment according to the firefighting information; and controlling the firefighting material generator to generate the firefighting material and spraying the firefighting material through the at least one firefighting sprayer upon judging that there is a fire in the muffling compartment.

For example, in the firefighting method provided by an embodiment of the present disclosure, periodically detecting the firefighting information of the muffling compartment by using the at least one fire detector includes: periodically performing temperature detection at different positions in the muffling compartment and generate a temperature data set; periodically performing smoke concentration detection at different positions in the muffling compartment and generate a smoke concentration data set; and periodically performing combustible gas concentration detection at different positions in the muffling compartment and a combustible gas concentration data set.

For example, in the firefighting method provided by an embodiment of the present disclosure, judging whether there is a fire in the muffling compartment according to the firefighting information includes: in response to a temperature threshold being externally input, periodically comparing a size relationship between the temperature data set and the temperature threshold; upon more than half of temperature values in the temperature data set being higher than the temperature threshold, judging that there is a fire in the muffling compartment; and upon less than half of the temperature values in the temperature data set being higher than the temperature threshold, judging that there is no fire in the muffling compartment, and outputting a first early warning information, wherein the first early warning information includes warning temperatures whose values are higher than the temperature threshold and detection positions of the warning temperatures.

For example, in the firefighting method provided by an embodiment of the present disclosure, judging whether there is a fire in the muffling compartment according to the firefighting information further includes: in response to a smoke concentration threshold being externally input, periodically comparing a size relationship between the smoke concentration data set and the smoke concentration threshold; upon more than half of smoke concentration values in the smoke concentration data set being higher than the smoke concentration threshold, judging that there is a fire in the muffling compartment; and upon less than half of the smoke concentration values in the smoke concentration data set being higher than the smoke concentration threshold, judging that there is no fire in the muffling compartment, and outputting a second early warning information, wherein the second early warning information includes warning smoke concentrations whose values are higher than the smoke concentration threshold and detection positions of the warning smoke concentrations.

For example, in the firefighting method provided by an embodiment of the present disclosure, judging whether there is a fire in the muffling compartment according to the firefighting information further includes: in response to a combustible gas concentration threshold being externally input, periodically comparing a size relationship between the combustible gas concentration data set and the combustible gas concentration threshold; upon more than half of combustible gas concentration values in the combustible gas concentration data set being higher than the combustible gas concentration threshold, judging that there is a fire in the muffling compartment; and upon less than half of the combustible gas concentration values in the combustible gas concentration data set being higher than the combustible gas concentration threshold, judging that there is no fire in the muffling compartment, and outputting a third early warning information, wherein the third early warning information includes warning combustible gas concentrations whose values are higher than the combustible gas concentration threshold and detection positions of the warning combustible gas concentrations.

At least one embodiment of the present disclosure further provides a computer readable storage medium storing a program capable of being loaded and executed by a processor to realize the abovementioned firefighting method of the fracturing device.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
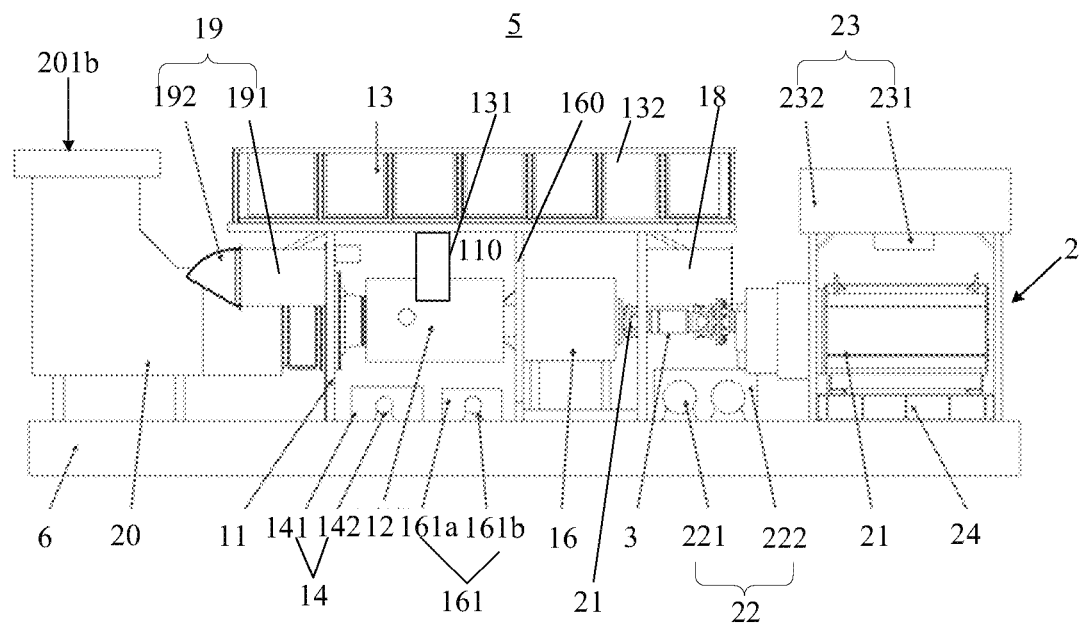
FIG. 1 is a structural schematic diagram of a fracturing device according to at least one embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect. The terms "on," "under," "right," "left" and the like are only used to indicate relative position relationship, and in a case that the position of an object is described as being changed, the relative position relationship may be changed accordingly.

Because a turbine engine can directly use natural gas as fuel and has the advantages of small size, light weight, high power density, etc., driving by a turbine engine, compared to by a diesel engine, is conducive to reducing the size of the fracturing device and has the advantages of environmental protection, high driving efficiency, etc. Moreover, the power supply pressure in a fracturing operation site can be reduced when a turbine engine is used for driving compared to directly using an electric motor for driving. In addition, the turbine engine further has the advantages of small size, light weight, high power density and the like.

In another aspect, the turbine engine generates power through the rotation of an impeller driven by a fluid. Therefore, it is necessary to keep the impeller and blades of the turbine engine clean and prevent device breakdown due to disruption in the balance of the impeller or damage of the impeller caused by impurities.

At least one embodiment of the present disclosure provides a fracturing device which includes a power unit. The power unit includes a muffling compartment, a turbine engine, an air intake unit and a cleaner. The air intake unit is communicated with the turbine engine through an intake pipe and is configured to provide a combustion-supporting gas to the turbine engine. The cleaner is configured to clean the turbine engine. The air intake unit is located at the top of the muffling compartment, and the muffling compartment has an accommodation space. The turbine engine and the cleaner are located within the accommodation space. The cleaner is located at the side, away from the air intake unit, of the turbine engine.

The fracturing device according to at least one embodiment of the present disclosure can facilitate the air intake unit to take in air by disposing the air intake unit above (at the top of) the turbine engine, and meanwhile can realize a compact structure by disposing the cleaner below the turbine engine to arrange the fracturing device in three layers (i.e. upper, middle and lower layers), which thus reduces the size of the fracturing device and facilitates transportation. In addition, the turbine engine is disposed in the muffling compartment, which is conducive to noise reduction.

For example, the term "below" as used in this embodiment of the present disclosure is not necessarily about being "directly below" and may also mean "obliquely below".

In at least one embodiment, the cleaner is directly driven by electric power, i.e., by an electric motor, so that the space occupied by the cleaner can be effectively reduced, and it is convenient to place the cleaner below the turbine engine. For example, the highest point of the cleaner is below the lowest point of the turbine engine. Such an arrangement may prevent the cleaner from shielding the turbine engine in the height direction, thereby facilitating the maintenance of the turbine engine.

In other examples, the cleaner may also be driven pneumatically or hydraulically. The driving mode of the cleaner is not limited by the embodiments of the present disclosure.

FIG. 1 is a structural schematic diagram, for example, a side view, of a fracturing device according to at least one embodiment of the present disclosure.

As shown in FIG. 1, the fracturing device 5 includes a power unit 1. The power unit 1 includes a muffling compartment 11, a turbine engine 12, an air intake unit 13 and a cleaner 14.

The muffling compartment 11 has an accommodation space 110, and the turbine engine 12 and the cleaner 14 are located within the accommodation space 110. For example, a muffler such as soundproof sponge or a muffler plate is disposed on the inner wall of the muffling compartment.

The air intake unit 13 is located at the top of the muffling compartment 11 and communicated with the turbine engine 12 through an intake pipe 131, and the air intake unit 13 is configured to provide a combustion-supporting gas to the turbine engine 12. For example, the air intake unit 13 includes an intake filter and an intake muffler, and the intake muffler has one end connected to the intake filter and another end communicated with the intake pipe 131.

For example, the air intake unit 13 comprises a plurality of intake cabins 132 arranged side by side. The plurality of intake cabins 132 help to enlarge the size of the air intake unit 13, thus providing a high gas capacity to increase the power of the turbine engine 12. The intake cabins 132 also help to reduce the resistance of air intake and exhaust, thereby being conducive to prolonging the service life of the turbine engine.

For example, the air intake unit 13 extends beyond the range of the muffling compartment 11 in the axial direction of the turbine engine, helping to enlarge the size of the intake cabins and protect (e.g., keep out the rain) the structure (e.g., an air inlet assembly and an air outlet assembly as described below) thereunder. It should be noted that the mentioned axial direction of the turbine engine may be the extension direction of a transmission shaft or an output shaft in the turbine engine.

The air intake unit 13 is fixed to the top of the muffling compartment 11, for example, by welding.

For example, the cleaner 14 is located at the side, away from the air intake unit 13, of the turbine engine 12, i.e., below the turbine engine. For example, the cleaner 14 may be located directly or obliquely below the turbine engine 12. For example, the cleaner 14 includes a water tank 141 and a cleaning pump 142. For example, the cleaner 14 is electrically driven, and the space used by the cleaner can thus be reduced. In another examples, the cleaner may be driven by an air compressor which is located, for example, outside the muffling compartment. The air compressor may be driven electrically, for example. In further another examples, the cleaner may be driven by a hydraulic system which may be driven electrically for example.

For example, the power unit 1 further includes a starter located within the muffling compartment 11 and configured to start the turbine engine 12.

Figure 2:
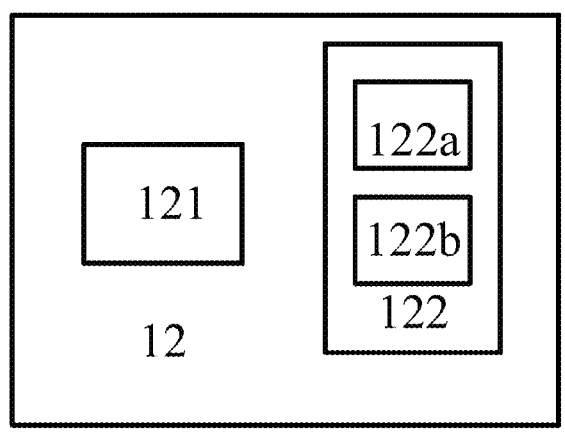
FIG. 2 is a structural schematic diagram of a turbine engine according to at least one embodiment of the present disclosure.

For example, the starter includes an electric motor. For example, the electric motor is configured to directly start the turbine engine 12, i.e., the turbine engine is started electrically. In this case, for example, as shown in FIG. 2, the starter 121 is integrated into the turbine engine.

The electric power needed to start the turbine engine is far less than that directly used to drive a fracturing pump unit, thus reducing the power supply demand in the fracturing work site.

In another examples, the turbine engine 12 includes a hydraulic system. The electric motor in the starter is configured to drive the hydraulic system to start the turbine engine, i.e., the hydraulic system is driven electrically. For example, the electric motor is located at the side, away from the air intake unit, of the turbine engine 12.

Compared with a diesel-driven hydraulic system, the electric motor takes up only small space and thus can be placed below the turbine engine.

For example, the hydraulic system includes a hydraulic pump, a hydraulic motor, various valves, a hydraulic oil reservoir, a hydraulic oil radiator, etc. For example, the hydraulic system is configured to be driven by the electric motor to drive a fuel pump, a starting motor and so on of the turbine engine 12, thereby starting the turbine engine 12.

For example, the power unit further includes a first lubricating system 122 configured to lubricate the turbine engine 12. FIG. 2 schematically shows a diagram of the turbine engine 12. As shown in FIG. 2, the first lubricating system 122 is integrated into the turbine engine 12.

The first lubricating system 122 includes a first lubricating oil reservoir 122a and a first driving mechanism 122b. The first driving mechanism includes an electric motor, that is, the first lubricating system is driven electrically.

For example, as shown in FIG. 1, the power unit 1 further includes a deceleration mechanism 16 and a second lubricating system 161 which are located within the muffling compartment 11. The second lubricating system 161 is configured to lubricate the deceleration mechanism 16. The deceleration mechanism 16 is connected to an output shaft of the turbine engine 12, and the deceleration mechanism 16 and the turbine engine 12 are arranged along the axial direction of the turbine engine 12.

The second lubricating system 161 includes a second lubricating oil reservoir 161a and a second driving mechanism 161b. The second driving mechanism 161b includes an electric motor, i.e., the second lubricating system 161 is driven electrically and thus can have a small size.

For example, as shown in FIG. 1, the second lubricating system 161 is located at the side, away from the air intake unit 13, of the turbine engine 12, for example, below the turbine engine 12. For example, the second lubricating system 16 and the cleaner 14 are arranged along the axial direction of the turbine engine 12, and the second lubricating system 16 is closer to the deceleration mechanism 16 than the cleaner 14, thus facilitating the lubrication of the deceleration mechanism 16 by the second lubricating system 161.

The muffling compartment is a relatively closed cabin. The operation of the turbine engine 12 can easily result in a high temperature or natural gas leakage within the muffling compartment and the danger is concealed, which may result in lagging danger judgment in human inspection without reliable guarantee for the safety of the personnel and the device.

For example, the power unit 1 further includes a firefighting system. The firefighting system may realize advance warning on the danger within the muffling compartment. Moreover, in at least one example, the firefighting system may automatically extinguish fire within the muffling compartment 11, thus greatly improving the reliability of device operation and the safety of the personnel.

Figure 3A:
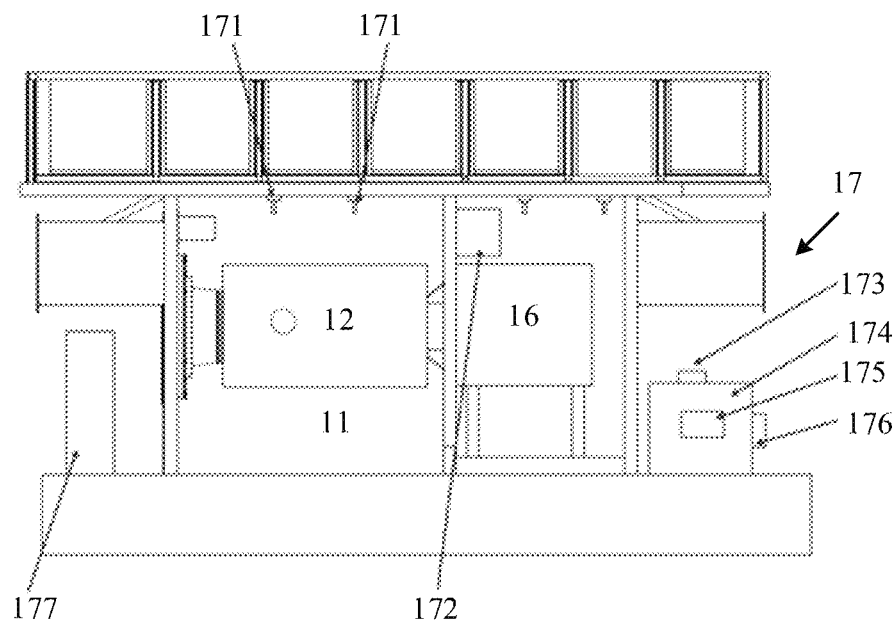
FIG. 3A is a structural schematic diagram of a firefighting system according to at least one embodiment of the present disclosure.

FIG. 3A is a schematic diagram of a firefighting system according to at least some embodiments of the present disclosure. For the sake of clarity, some components of the fracturing device are omitted from FIG. 3A.

As shown in FIG. 3A, the firefighting system 17 includes at least one firefighting detector 171 and a firefighting material generator 172 which are located within the muffling compartment 11. The firefighting detectors 171 may include, but not be limited to, a temperature detector, a smoke detector, a flame detector, a combustible gas detector, etc. In the case where a plurality of types of firefighting detectors are used, the number of the firefighting detector of each type would not be limited too.

The firefighting material generator 172 is filled with a firefighting material. For example, the firefighting material includes an aerosol. Compared with the traditional dry powder material, the aerosol in an equal volume can have a better fire extinguishing performance. Therefore, a container for the aerosol needs a smaller space and thus can be easily disposed within the muffling compartment 11.

As shown in FIG. 3A, the firefighting system 17 includes a plurality of firefighting detectors 171 disposed at the top of the muffling compartment 11 for detection at different positions within the muffling compartment 11. For example, the firefighting detectors 171 are disposed directly above the turbine engine 12 and the deceleration mechanism 16, respectively. The firefighting detectors 171 can be the same or different in type. The firefighting material generator 172 is disposed on a support column 160 between the turbine engine 171 and the deceleration mechanism 16.

For example, the firefighting system 17 further includes an alertor 173, a controller 174, a firefighting monitor 175 and an emergency switch 176 which are located outside the muffling compartment 11. The controller 174 is in signal connection (e.g., communication connection) with the alertor 173, the turbine engine 171 and the firefighting material generator 172 respectively. In the case where an anomaly (e.g., that at least one of temperature, smoke consistency, combustible gas concentration in the muffling compartment 11 is above a threshold value, or a flame is generated) is detected by the firefighting detector 171, the controller 174 is triggered to control the firefighting material generator 172 to start automatically and eject the firefighting material and simultaneously control the alertor 173 to give an alerting signal.

For example, the firefighting system 17 further includes a hand fire extinguisher 177 located outside the muffling compartment, allowing the personnel on the spot to extinguish fire manually. For example, the hand fire extinguisher 177 may be a dry powder fire extinguisher.

Figure 3B:
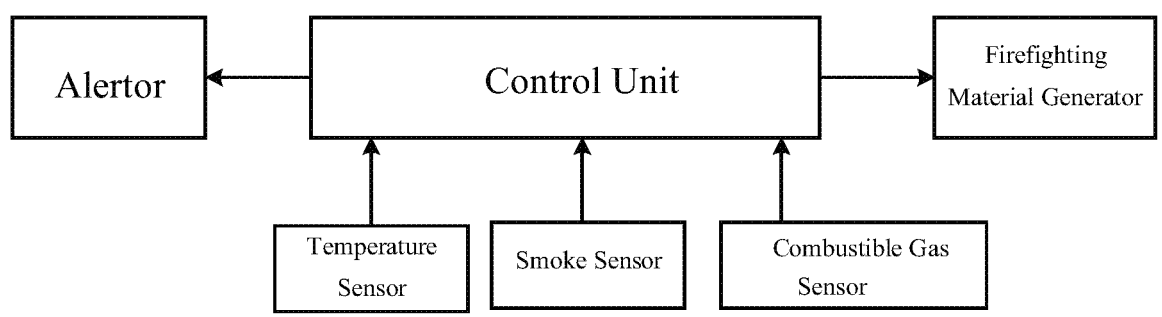
FIG. 3B is a structural schematic diagram of a firefighting system according to some other embodiments of the present disclosure.

FIG. 3B is a schematic diagram of a firefighting system in a fracturing device according to another examples of the present disclosure. As shown in FIG. 3B, the firefighting system includes a control unit, an alertor, a firefighting material generator, a plurality of temperature sensors, a plurality of smoke sensors and a plurality of combustible gas sensors. The control unit is in signal connection with the alertor, the firefighting material generator, the temperature sensors, the smoke sensors and the combustible gas sensors respectively.

For example, the control unit is configured to control the plurality of temperature sensors to detect the temperature simultaneously at different positions within the compartment of the turbine engine and generate a temperature data set from the obtained temperature data. The operation is repeated cyclically and the temperature data sets are output, thus realizing the detection of the temperature in the compartment.

For example, the control unit is further configured to control the plurality of smoke detectors to detect the smoke simultaneously at different positions within the compartment of the turbine engine and generate a smoke data set from the obtained smoke data. The operation is repeated cyclically and the smoke data sets are output, thus realizing the detection of the smoke in the compartment.

For example, the control unit is further configured to control the plurality of combustible gas sensors to detect the concentration of the combustible gas simultaneously at different positions within the compartment of the turbine engine and generate a combustible gas data set from the obtained combustible gas concentration data. The operation is repeated cyclically and the combustible gas data sets are output, thus realizing the detection of the combustible gas in the compartment. The combustible gas includes, for example, methane.

For example, the control unit is further configured to, in response to a preset temperature threshold value, cyclically determine whether more than half of temperature data in the temperature data sets is above the temperature threshold value, output firefighting information if yes, and output alert information if no, where the alert information contains the temperature data of the temperature above the temperature threshold value and detection positions thereof.

For example, the control unit is further configured to, in response to a smoke threshold value input from the outside, cyclically determine whether more than half of smoke data in the smoke data sets is above the smoke threshold value, output firefighting information if yes, and output alert information if no, where the alert information contains the smoke data of the smoke above the smoke threshold value and detection positions thereof.

For example, the control unit is further configured to, in response to a combustible gas concentration threshold value input from the outside, cyclically determine whether more than half of combustible gas concentration data in the combustible gas data sets is above the combustible gas concentration threshold value, output warning information if yes, and output alert information if no, where the alert information contains the values of combustible gas concentration above the combustible gas concentration threshold value and detection positions thereof.

For example, the control unit is further configured to, in response to the firefighting information, trigger the firefighting material generator to perform firefighting operation, for example, ejecting aerosol, carbon dioxide, etc., and simultaneously trigger the alertor to give an alerting signal, for example, a sound signal and/or a light signal. For example, the firefighting material generator includes a sprinkler having structures such as a nozzle, a liquid reservoir and a pipe.

For example, the control unit is further configured to recheck the detection of the combustible gas to improve the detection accuracy. For example, the control unit is configured to, in response to the firefighting information, determine whether the warning information is received simultaneously, carry out no operation if yes, and if no, generate an anomaly set from all combustible gas concentration data of combustible gas concentration below a combustible gas concentration threshold value and the detection positions thereof, and output the anomaly set.

The firefighting system can recheck and calibrate the combustible gas concentration sensors based on the temperature sensors and the smoke sensors, and avoid disfunction of the equipment and further improve the fire safety performance of the equipment.

For example, as shown in FIG. 1, the power unit 1 further includes an air inlet assembly 18 and an air outlet assembly 19. The air inlet assembly 18 is located at one side of the turbine engine along the axial direction of the turbine engine and is communicated with the accommodation space of the muffling compartment 12. The air outlet assembly 19 is located at the other side of the turbine engine along the axial direction and disposed opposite to the air inlet assembly 8, and the air outlet assembly 19 is communicated with the accommodation space of the muffling compartment 12. The air inlet assembly 18 and the air outlet assembly 19 are configured to create a circulation environment in the muffling compartment, helping to dissipate heat from the compartment.

Figure 4A:
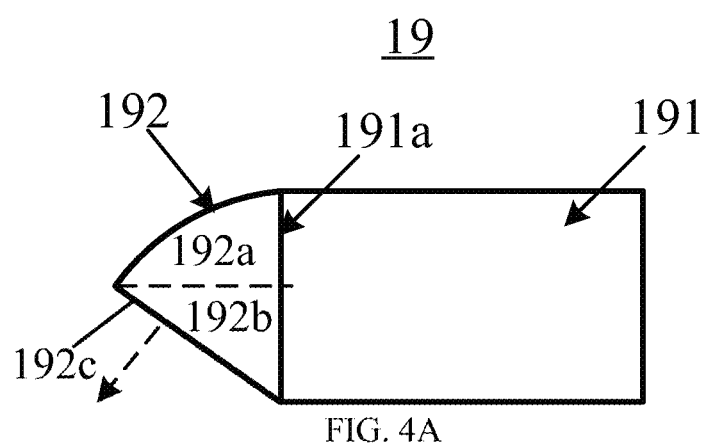
FIG. 4A is a structural schematic diagram of an air outlet assembly according to at least one embodiment of the present disclosure.

FIG. 4A shows an enlarged schematic diagram of the air outlet assembly 19. For example, as shown in FIG. 4A, the air outlet assembly 19 includes an air outlet pipe 191 and a lead-out portion 192 connected to the air outlet pipe 191. The lead-out portion is configured to change an orientation of an air outlet 192c of the air outlet assembly, thereby effectively reducing sand wind that may enter the muffling compartment via the air outlet assembly to cause damage to the materials in the compartment.

For example, during loading or transportation of the fracturing device, the air outlet assembly 19 is generally closer to the front, namely the truck head, in the direction of transportation, while the air inlet assembly 18 is closer to the back, namely the truck tail. Thus, the fracturing device can be conveniently unloaded to carry out fracturing work after arriving at the work site. Consequently, during transportation, sand wind can easily get into the muffling compartment via the air outlet assembly 19.

As shown in FIG. 4A, the lead-out portion 192 is provided to change the orientation of the air outlet 192c of the air outlet assembly 19 from being horizontally forward (i.e., along the moving direction) to being obliquely downward, thus effectively reducing sand wind entering. The orientation of the air outlet 192c of the air outlet assembly 19 is shown by the dotted arrow in FIG. 4A. However, the orientation of the air outlet of the air outlet assembly with the lead-out portion is not limited in the embodiments of the present disclosure. In another examples, the air outlet 192c may be upward or oriented laterally, which is not limited in the embodiments of the present disclosure. For example, the lead-out portion 192 is rotatably connected to the air outlet pipe 191, and the orientation of the air outlet of the air outlet assembly 19 can be changed by rotating the lead-out portion 192.

As shown in FIG. 4A, for example, the lead-out portion 192 is in the shape of an elbow and has a cone-shaped section with a cone angle of, for example, 40°-60° (e.g., 45°).

For example, as shown in FIG. 4A, the lead-out portion 192 includes a shielding portion 192a and an air outlet portion 192b. The shielding portion 192a is configured to shield an air outlet 191a of the air outlet pipe 191 to keep out the external sand wind. The air outlet portion 192b is configured to exhaust the gas that flows from the air outlet pipe 191 into the lead-out portion 192. The dividing line between the shielding portion 192a and the air outlet portion 192b is shown by the dotted line perpendicular to the air outlet 191a of the air outlet pipe 191 in FIG. 4A, which actually is not necessarily present.

For example, the orthographic projection of the shielding portion 192a on the plane where the air outlet 191a of the air outlet pipe 191 is positioned is at least partially overlapped with the air outlet 191a for shielding, with an overlapping area greater than 30% of the area of the air outlet to realize effective shielding.

The lead-out portion 192 is structurally designed to realize shielding, which does not need extra power or control.

Figure 4B:
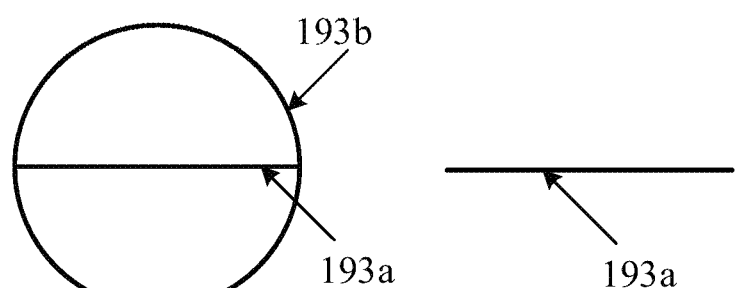
FIG. 4B is a structural schematic diagram of an air outlet portion according to at least one embodiment of the present disclosure.

In another examples, for example, as shown in FIG. 4B, the air outlet portion 192b may include a revolving shaft 193a and a blade 193b disposed on the revolving shaft 193a. The blade 193b is capable of rotating around the revolving shaft, for example, under the action of an external force. For example, the revolving shaft and the blade are located at the air outlet of the air outlet portion. By rotating the blade, the air outlet portion can be opened and closed. For example, the air outlet portion may be closed during transportation and may be opened during fracturing. FIG. 4B shows a schematic diagram of the revolving shaft and the blade when the air outlet portion is closed (on the left of FIG. 4B) and opened (on the right of FIG. 4B) respectively in a direction perpendicular to the air outlet surface of the air outlet portion 192b.

Figure 5A:
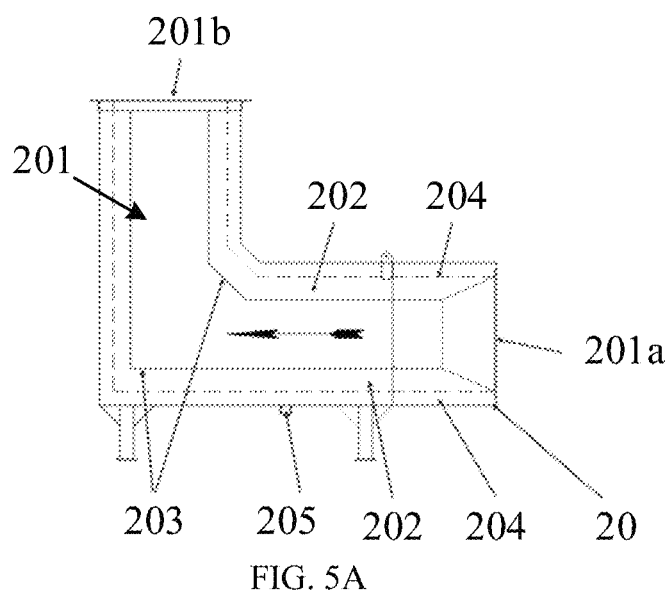
FIG. 5A is a structural schematic diagram of an exhaust muffler according to at least one embodiment of the present disclosure.

For example, the power unit further includes an exhaust muffler which is communicated with the turbine engine 12 through an exhaust pipe and configured to allow the gas from the turbine engine 12 to be exhausted into the atmosphere after being muffled and deflected. FIG. 5A shows a structural schematic diagram of an exhaust muffler according to at least one embodiment of the present disclosure.

As shown in FIG. 5A, the exhaust muffler 20 includes an L-shaped gas delivery pipe 201. The L-shaped gas delivery pipe 201 has an intake port 201a at one end, and the intake port 201a is communicated with the turbine engine 12 through an exhaust pipe for gas intake, and the gas delivery pipe 201 has an upward exhaust port 201b at the other end, so as to exhaust the gas from the turbine engine to the atmosphere. The direction of gas delivery is shown by the arrow in FIG. 5A.

The exhaust muffler 20 further includes a muffling layer 202 disposed on the inner wall of the gas delivery pipe 201 to serve for muffling. Noise generated during gas delivery can be effectively reduced when the gas in the gas delivery pipe 201 is in contact with the muffling layer 202. For example, the muffling layer 202 includes soundproof sponge.

For example, the exhaust muffler 20 further includes a perforated muffler plate 203 located on the inner wall of the muffling layer 202. The perforated muffler plate 203 has holes to allow the gas in the delivery pipe 201 to be in contact with the muffling layer 202 for muffling.

Figure 5B:
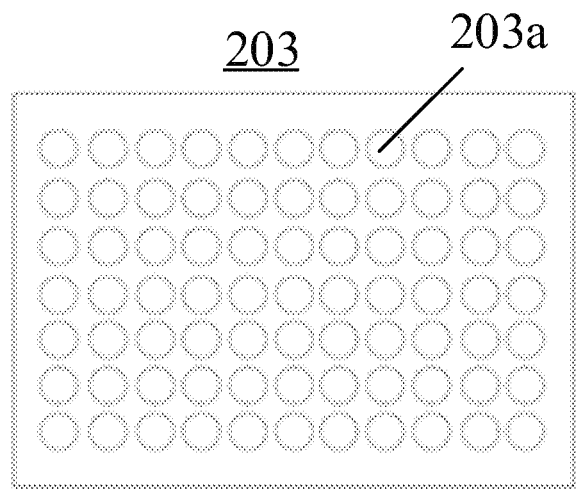
FIG. 5B is a structural schematic diagram of an exhaust muffler plate according to at least one embodiment of the present disclosure.

FIG. 5B shows a structural schematic diagram of the perforated muffler plate 203. For example, the perforated muffler plate 203 is tubular, and FIG. 5B shows a partial schematic diagram of the perforated muffler plate 203.

For example, the perforated muffler plate 203 has a plurality of muffling holes 203a arranged in an array. Thus, the gas can be brought into full contact with the perforated muffler plate, and the muffling effect can be enhanced by collision between the gas and the hole walls of the perforated muffler plate 203. For example, the muffling hole 203a has a radius of 2-8 mm. The planar shape of the muffling hole is not limited in the embodiments of the present disclosure. For example, the planar shape of the muffling hole may be elongated round, oval, square, diamond, etc.

For example, as shown in FIG. 5A, the intake port 201a of the exhaust muffler 20 has a retracted structure. The inner diameter of the retracted structure is gradually reduced along the intake direction. The space undergoes contraction when the exhaust gas enters the gas delivery pipe 201, so that the gas flow direction changes rapidly, thereby improving the muffling effect.

For example, as shown in FIG. 5A, the exhaust muffler 20 further includes a thermal insulating layer 204 located between the inner wall of the exhaust muffler 20 and the muffling layer 202 to prevent a housing of the exhaust muffler from being too hot. For example, the thermal insulation design is necessary because the temperature of the exhaust gas from the turbine engine is up to 600° C.

For example, the exhaust muffler 20 further includes a water port 205 located in the bottom. For example, when water flows into the exhaust muffler 20, the water can be drained through the perforated muffler plate 203 and finally discharged via the water port 205.

The exhaust muffler 20 shown in FIG. 5A keeps the gas delivery pipe unblocked while serving for muffling, thus reducing the exhaust resistance and improving the exhaust efficiency.

Figure 5C:
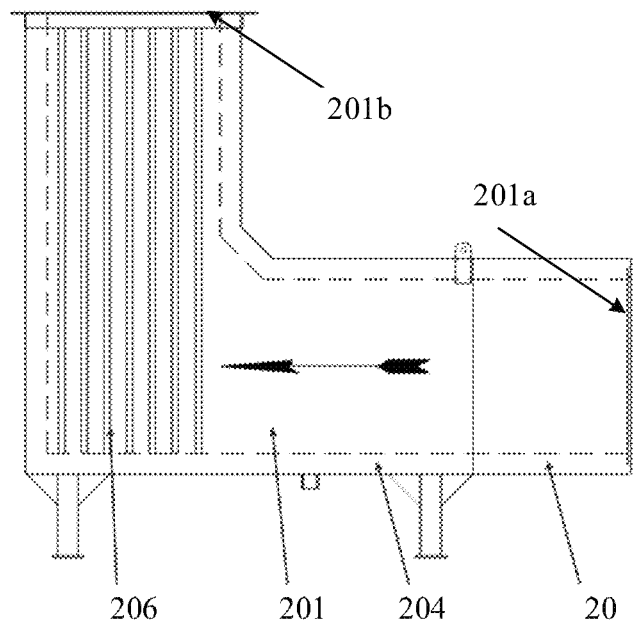
FIG. 5C is a structural schematic diagram of an exhaust muffler according to some other embodiments of the present disclosure.

FIG. 5C is a structural schematic diagram of an exhaust muffler according to another embodiments of the present disclosure. As shown in FIG. 5C, the exhaust muffler 20 differs from the embodiment shown in FIG. 5A in that the exhaust muffler 20 includes a muffling barrier 206 to realize the noise reduction function by increasing the exhaust resistance. For example, the muffling barrier 206 includes a heat-resisting material to absorb noise. For example, the heat-resisting material is soundproof sponge. For example, the muffling barrier 206 is disposed in a branch, close to the exhaust port 201b, of the gas delivery pipe 201, and the exhaust gas entering the pipe arrives at the exhaust port 201b through the muffling barrier 206.

For example, in some examples, the air outlet of the lead-out portion 192 of the air outlet assembly 19 is oriented towards the outer surface of the exhaust muffler 20, so that the surface of the exhaust muffler is cooled by the exhaust gas from the air outlet assembly 19, thus realizing effective utilization of the exhaust gas.

As shown in FIG. 1, the fracturing device 5 further includes a fracturing pump unit 2. The fracturing pump unit 2 includes a fracturing pump 21 which is, for example, a plunger pump. The fracturing device 5 further includes a transmission mechanism 3. For example, the transmission mechanism 3 includes a coupling. For example, the coupling may be in the form of a flexible coupling, a transmission shaft, a clutch, etc.

The fracturing pump unit 2 is connected to the power unit 1 through the transmission mechanism 3, and the power unit 1 is configured to drive the fracturing pump 21 to carry out fracturing work. The turbine engine 12, the transmission mechanism 3 and the fracturing pump 21 are disposed in the axial direction of the turbine engine in sequence, for example, coaxially, thus improving the transmission efficiency.

Figure 6:
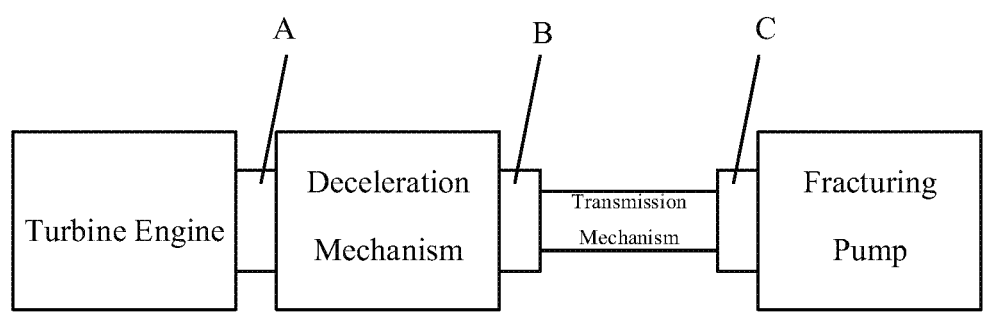
FIG. 6 is a schematic diagram of a fracturing device according to some other embodiments of the present disclosure.

FIG. 6 is a schematic diagram of a fracturing device according to at least one embodiment of the present disclosure. As shown in FIG. 6, the turbine engine, the deceleration mechanism, the transmission mechanism and the fracturing pump are disposed in the axial direction of the turbine engine in sequence, for example, coaxially, thus improving the transmission efficiency.

For example, the fracturing device may further include a brake mechanism disposed between the turbine engine and the fracturing pump, thus realizing power cutoff between the fracturing pump and the turbine engine. For example, when the turbine engine is started, the speed is initially not high enough, and the brake mechanism may be started to prevent the pump from being driven and affecting the fracturing effect. For example, the brake mechanism may include a brake block, a brake caliper, etc.

As shown in FIG. 6, the brake mechanism may be disposed at any one or more of the position between the turbine engine and the deceleration mechanism (i.e. position A), the position between the deceleration mechanism and the transmission mechanism (i.e. position B) and the position between the transmission mechanism and the fracturing pump (i.e. position C), finally realizing cutoff between power input and output. For example, as shown in FIG. 1, the brake mechanism may be located between the deceleration mechanism 16 and the transmission mechanism 3 or integrated into the deceleration mechanism 16, providing a more compact integrated structure.

As shown in FIG. 1, the fracturing pump unit 2 further includes a third lubricating system 22 which is configured to lubricate the fracturing pump 21. The third lubricating system 22 includes an electric motor 221 and is located at the side, away from the air intake unit 13, of the transmission mechanism 3. The third lubricating system 22 further includes a lubricating oil reservoir 222.

For example, as shown in FIG. 1, the third lubricating system 22 is located below the transmission mechanism 3, thus saving space.

For example, as shown in FIG. 1, the fracturing pump unit 2 further includes a lubricating oil heat sink 23 which is configured to cool the third lubricating system 22. The lubricating oil heat sink 23 is located above the fracturing pump 21, i.e., at the side, away from a base of the fracturing pump 21, of the fracturing pump 21. For example, the lubricating oil heat sink 23 includes an electric motor 231 and a radiator 232.

The lubricating oil heat sink 23 and the fracturing pump 21 are arranged longitudinally, providing a more compact structure.

For example, the fracturing pump unit 2 further includes a fracturing pump base 24 located below the fracturing pump 21 (i.e., at the side away from the air intake unit 13). The fracturing pump base 24 is configured to bolster the fracturing pump 21, so that the fracturing pump 21 and the turbine engine 12 are linearly arranged in the axial direction of the turbine engine 12, thus improving the transmission efficiency.

For example, as shown in FIG. 1, the fracturing device 5 further includes a bottom skid 6. The power unit 1 and the pump unit 2 are mounted on the bottom skid 6 to be fixed.

In the example as shown in FIG. 1, the fracturing device 5 is a skid-mounted device. However, this is not limited in the embodiments of the present disclosure. In another examples, the fracturing device 5 may also be a vehicle-mounted device or a semitrailer mounted device.

Figure 7A:
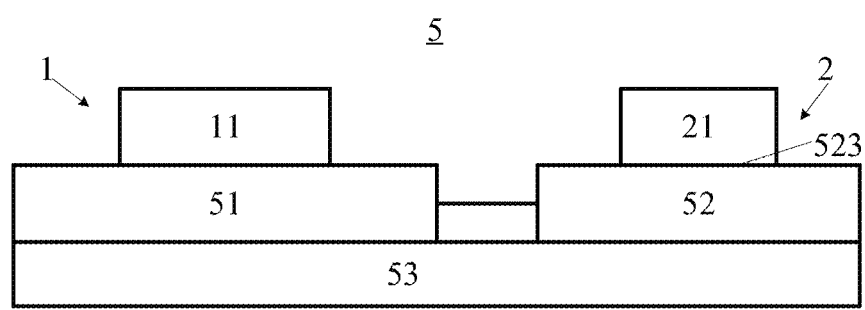
FIG. 7A is a structural schematic diagram of a fracturing device according to still other embodiments of the present disclosure.

FIG. 7A is a schematic diagram of a fracturing device according to another embodiments of the present disclosure. As shown in FIG. 7A, the power unit 1 further includes a power skid 51. The muffling compartment 11 is mounted on the power skid 51 to be fixed. The pump unit 2 further includes a pump skid 52. The pump skid 52 has a bearing surface 523, and the fracturing pump 21 is mounted on the bearing surface 523 of the pump skid 52 to be fixed. Control circuits and circuit traces for the power unit 1 are disposed on the power skid 51 and control circuits and circuit traces for the pump unit 2 are disposed on the pump skid 52.

The forms of the power skid and the pump skid are not limited in the embodiments of the present disclosure. For example, the power skid/pump skid may merely include a bottom structure, or may include a bottom structure and a cage structure extending upwards. The cage structure is configured to further fix the unit mounted on the bottom structure.

For example, the power skid 51 and the pump skid 52 are detachably connected to facilitate transportation. The connection manner of the power skid 51 and the pump skid 52 is not limited in the embodiments of the present disclosure. For example, the two skids may be connected through a fastener, a connecting plate, etc.

For example, the power skid 51 and the pump skid 52 may be connected through a lug plate. One of the power skid 51 and the pump skid 52 has a single-lug plate, while the other one has a double-lug plate, and the two plates are connected through a pin shaft.

Figure 7B:
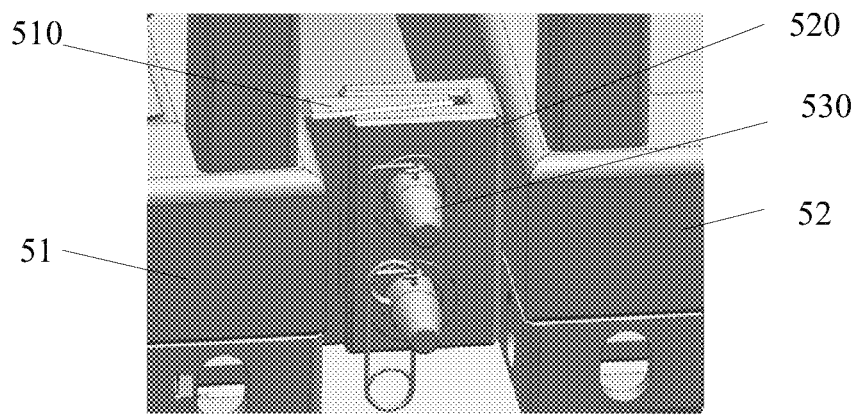
FIG. 7B and FIG. 7C are structural schematic diagrams of a fracturing device according to further still other embodiments of the present disclosure.
Figure 7C:
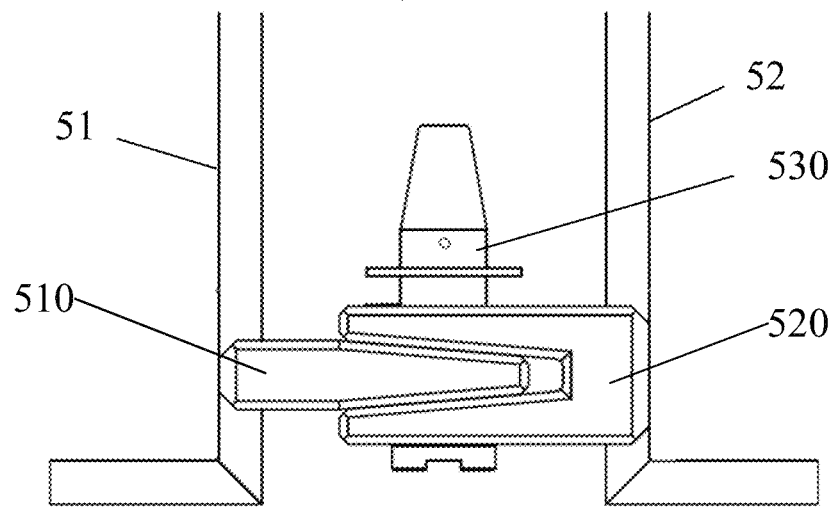

FIG. 7B shows a three-dimensional diagram of the connection between the power skid and the pump skid, and FIG. 7C shows a top view of the connection. As shown in FIG. 7B, the power skid 51 has a single-lug plate 510, while the pump skid 52 has a double-lug plate 520. The single-lug plate 510 is inserted into the double-lug plate 520. Pin holes of the two plates are aligned, and a pin shaft 530 is inserted into the pin holes to connect the power skid and the pump skid.

For example, the fracturing device 5 may further include an integrated skid 53. The power skid 51 and the pump skid 52 are respectively mounted on the integrated skid 53 to be fixed. For example, the power skid 51 and the pump skid 52 are detachably connected to the integrated skid 53 separately, thereby facilitating transportation.

Figure 8A:
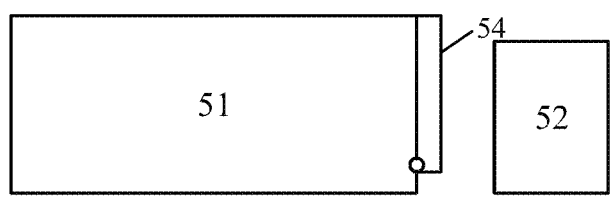
FIG. 8A and FIG. 8B are structural schematic diagrams of a fracturing device according to still other embodiments of the present disclosure.
Figure 8B:
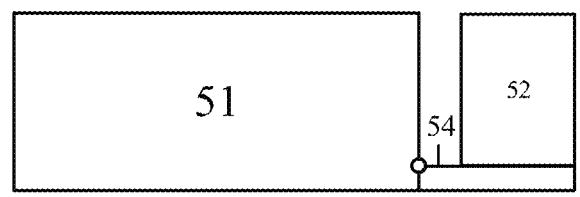

FIG. 8A and FIG. 8B are schematic diagrams of a fracturing device according to still another embodiments of the present disclosure. Unlike the embodiment shown in FIG. 7A, the power skid 51 includes a turnable mechanism 54 which is configured to be turned over to a horizontal state to carry the pump skid 52. For example, the pump skid 52 is detachably connected to the turnable mechanism 54. When the fracturing device is transported, the pump skid 52 may be removed and the turnable mechanism 54 may be recovered. After the arrival at the work site, the turnable mechanism 54 may be turned over to be horizontal and the pump skid 52 is mounted on the turnable mechanism 54. FIG. 8A and FIG. 8B show schematic diagrams of the turnable mechanism of the fracturing device being recovered and being working, respectively. For example, the power skid 51 may be integrated with the muffling compartment and the turbine engine and the pump skid may be integrated with the fracturing pump. For example, the turnable mechanism 54 may further serve to bolster the pump skid 52, so that the fracturing pump and the turbine engine are linearly arranged in the axial direction of the turbine engine, thus improving the transmission efficiency.

In at least one example, the turbine engine in the fracturing device is driven by a fuel (e.g., natural gas), while other auxiliary power systems (e.g., power for the lubricating systems, the cooling system, the cleaner, the starter, the brake mechanism, the deceleration mechanism, the heat sink and the gas pipe system) are all driven electrically. As a result, the fracturing device has the advantages of compact structure, small size and environmental protection while having high driving efficiency. In addition, the power supply pressure in the fracturing work site can be reduced.

Figure 9:
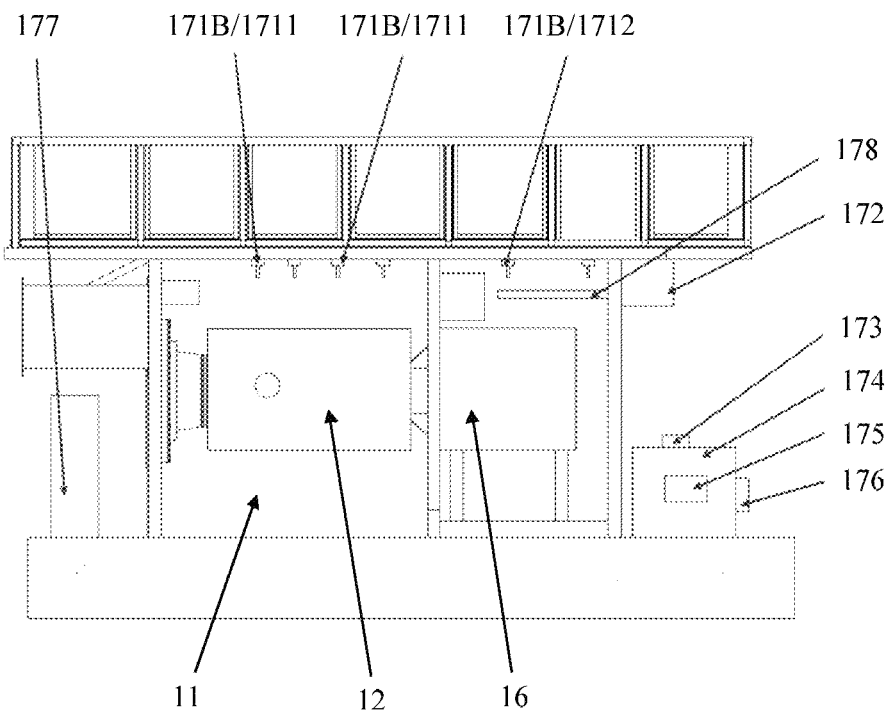
FIG. 9 is a schematic diagram of another fracturing device according to at least some embodiments of the present disclosure.
Figure 10:
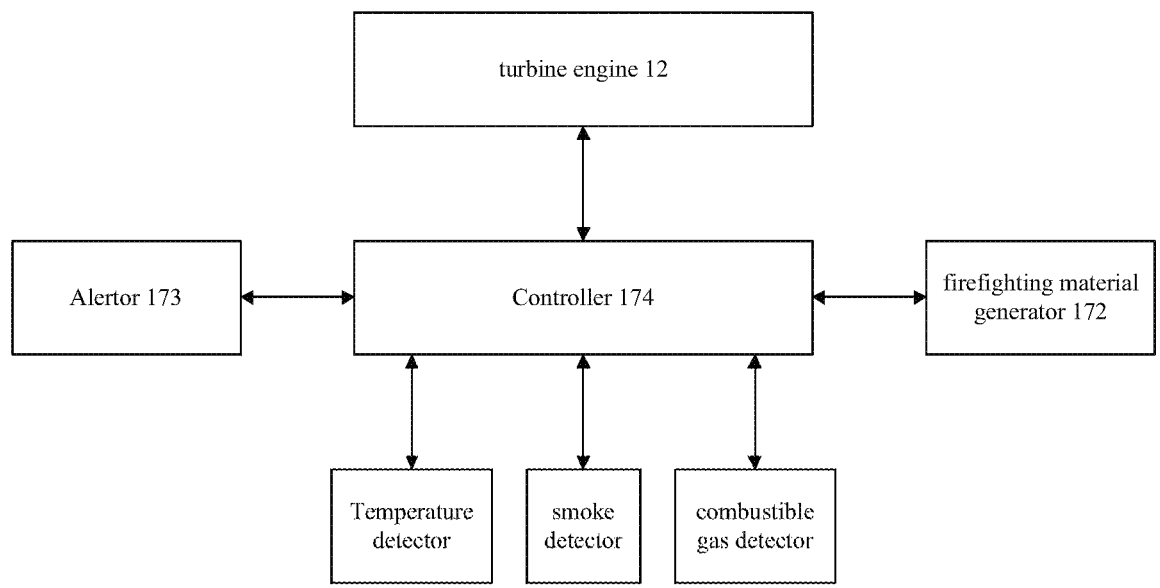
FIG. 10 is a schematic diagram of another firefighting system according to at least some embodiments of the present disclosure.

FIG. 9 is a schematic diagram of another fracturing device according to at least some embodiments of the present disclosure. FIG. 10 is a schematic diagram of another firefighting system according to at least some embodiments of the present disclosure.

As illustrated by FIG. 9 and FIG. 10, the fracturing device 5 includes a power unit 1, the power unit 1 includes a muffling compartment 11, a turbine engine 12, and a firefighting system 17; the firefighting system 17 includes a firefighting material generator 172, at least one firefighting sprayer 178 and at least one firefighting detector 171, the at least one firefighting sprayer 178 and the at least one firefighting detector 171 are located in the muffling compartment 11, each of the at least one firefighting sprayer 178 is connected with the firefighting material generator 172 and configured to spray out firefighting material generated by the firefighting material generator 172. In this way, upon there being a fire in the muffling compartment 11, the firefighting detector 171 can detect the fire, and the firefighting sprayer 178 can spray out firefighting material generated by the firefighting material generator 172 on the fire.

In some examples, as illustrated by FIG. 9 and FIG. 10, the firefighting system 17 further includes: a controller 174, being in a communication connection with the at least one firefighting detector 171 and the firefighting material generator 172, and configured to trigger the firefighting material generator 172 to generate the firefighting material according to information detected by the at least one firefighting detector 171.

In some examples, as illustrated by FIG. 9 and FIG. 10, the controller 174 is in a communication connection with the turbine engine 12 and configured to turn-off the turbine engine 12 upon there being a fire in the muffling compartment 11.

In some examples, as illustrated by FIG. 9 and FIG. 10, the at least one firefighting detector 171 includes one or more selected from the group consisting of a temperature detector, a smoke detector, a flame detector, and a combustible gas detector.

In some examples, the combustible gas detector includes a methane detector.

In some examples, as illustrated by FIG. 9 and FIG. 10, the at least one firefighting detector 171 includes an engine temperature detector 1711, located on a top of the muffling compartment 11 and above the turbine engine 12; the engine temperature detector 1711 is configured to detect a temperature of the turbine engine 12.

In some examples, as illustrated by FIG. 9 and FIG. 10, the power unit 1 further includes a deceleration mechanism 16, the deceleration mechanism 16 is connected with the turbine engine 12 and located in the muffling compartment 11; the at least one firefighting detector 171 includes a muffling compartment temperature detector 1712, located on a top of the muffling compartment 11 and above the deceleration mechanism 16, the muffling compartment temperature detector 1712 is configured to detect a temperature of the deceleration mechanism 16.

In some examples, as illustrated by FIG. 9 and FIG. 10, the firefighting material generator 172 is located outside the muffling compartment 11. In this way, the muffling compartment 11 can be more compact, so as to reduce the size of the muffling compartment 11. However, the embodiments of the present disclosure include but are not limited herein. The firefighting material generator 172 may be disposed in the muffling compartment 11.

In some examples, the firefighting material includes aerosol or dry ice. Compared with the traditional dry powder material, the aerosol in an equal volume can have a better fire extinguishing performance. Therefore, a container for the aerosol needs a smaller space.

In some examples, as illustrated by FIG. 9 and FIG. 10, the firefighting system 17 further includes: an alertor 173, configured to send out at least one of alerting sound and alerting light. In the case where an anomaly (e.g., that at least one of temperature, smoke consistency, combustible gas concentration in the muffling compartment 11 is above a threshold value, or a flame is generated) is detected by the firefighting detector 171, the controller 174 is triggered to control the firefighting material generator 172 to start automatically and eject the firefighting material and simultaneously control the alertor 173 to send out at least one of alerting sound and alerting light.

Figure 11:
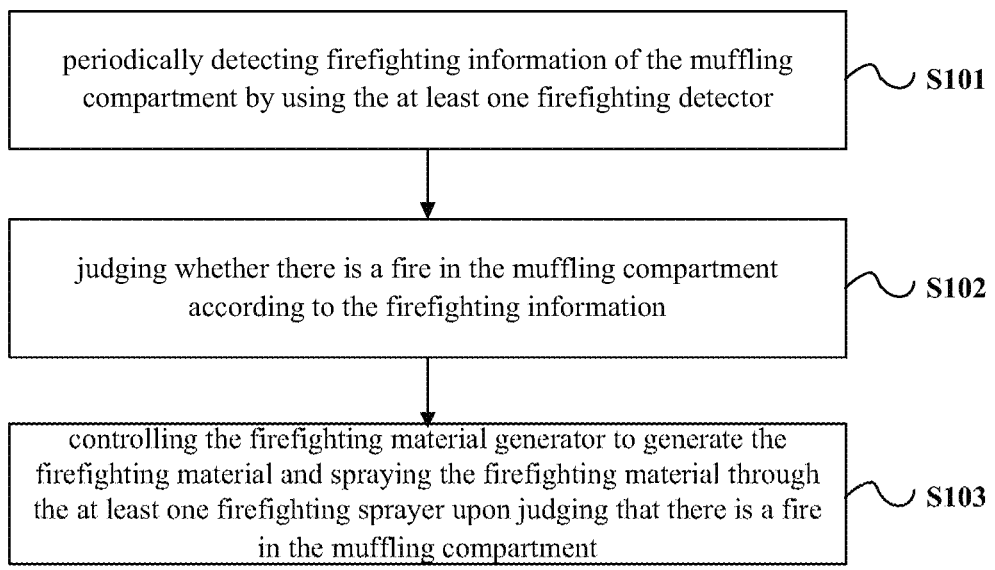
FIG. 11 is a flow chart of a firefighting method of the fracturing device provided by an embodiment of the present disclosure.

In some examples, as illustrated by FIG. 9 and FIG. 10, the firefighting system 17 further includes: a hand fire extinguisher 177, located outside the muffling compartment 11. So that, the personnel on the spot can extinguish fire manually. For example, the hand fire extinguisher 177 may be a dry powder fire extinguisher An embodiment of the present disclosure further provides a firefighting method of the fracturing device. FIG. 11 is a flow chart of a firefighting method of the fracturing device provided by an embodiment of the present disclosure. As illustrated by FIG. 11, the firefighting method further includes the following steps S101-S103:

S101: periodically detecting firefighting information of the muffling compartment by using the at least one firefighting detector.

S102: judging whether there is a fire in the muffling compartment according to the firefighting information.

S103: controlling the firefighting material generator to generate the firefighting material and spraying the firefighting material through the at least one firefighting sprayer upon judging that there is a fire in the muffling compartment.

In the firefighting method provided by the embodiment of the present disclosure, fire in the muffling compartment can be automatically detected by the at least one firefighting detector, and can automatically be extinguished by the firefighting material generator and the at least one firefighting sprayer. In the way, the safety of the fracturing device can be improved.

In some examples, periodically detecting the firefighting information of the muffling compartment by using the at least one fire detector includes: periodically performing temperature detection at different positions in the muffling compartment and generate a temperature data set; periodically performing smoke concentration detection at different positions in the muffling compartment and generate a smoke concentration data set; and periodically performing combustible gas concentration detection at different positions in the muffling compartment and a combustible gas concentration data set.

In some examples, judging whether there is a fire in the muffling compartment according to the firefighting information includes: in response to a temperature threshold being externally input, periodically comparing a size relationship between the temperature data set and the temperature threshold; upon more than half of temperature values in the temperature data set being higher than the temperature threshold, judging that there is a fire in the muffling compartment; and upon less than half of the temperature values in the temperature data set being higher than the temperature threshold, judging that there is no fire in the muffling compartment, and outputting a first early warning information, wherein the first early warning information includes warning temperatures whose values are higher than the temperature threshold and detection positions of the warning temperatures.

For example, the above "in response to a temperature threshold being externally input" may refer to receiving a temperature threshold being externally input.

In some examples, judging whether there is a fire in the muffling compartment according to the firefighting information further includes: in response to a smoke concentration threshold being externally input, periodically comparing a size relationship between the smoke concentration data set and the smoke concentration threshold; upon more than half of smoke concentration values in the smoke concentration data set being higher than the smoke concentration threshold, judging that there is a fire in the muffling compartment; and upon less than half of the smoke concentration values in the smoke concentration data set being higher than the smoke concentration threshold, judging that there is no fire in the muffling compartment, and outputting a second early warning information, wherein the second early warning information includes warning smoke concentrations whose values are higher than the smoke concentration threshold and detection positions of the warning smoke concentrations.

In some examples, judging whether there is a fire in the muffling compartment according to the firefighting information further includes: in response to a combustible gas concentration threshold being externally input, periodically comparing a size relationship between the combustible gas concentration data set and the combustible gas concentration threshold; upon more than half of combustible gas concentration values in the combustible gas concentration data set being higher than the combustible gas concentration threshold, judging that there is a fire in the muffling compartment; and upon less than half of the combustible gas concentration values in the combustible gas concentration data set being higher than the combustible gas concentration threshold, judging that there is no fire in the muffling compartment, and outputting a third early warning information, wherein the third early warning information includes warning combustible gas concentrations whose values are higher than the combustible gas concentration threshold and detection positions of the warning combustible gas concentrations.

In some examples, the firefighting method further includes: in respond to fire information, determining whether warning information is received at the same time. If the judgment result is yes, no processes needs to be done. If the judgment result is no, call all combustible gas detectors whose combustible gas concentration as detected is less than the combustible gas concentration threshold and the detection positions thereof to generate an abnormal group and output abnormal group. In this way, the abnormal combustible gas detectors can be detected.

At least one embodiment of the present disclosure further provides a computer readable storage medium storing a program capable of being loaded and executed by a processor to realize the abovementioned firefighting method of the fracturing device.

Based on this understanding, the technical solution of the present application can be embodied in the form of a software product, which can be stored in a nonvolatile storage medium (which can be CD-ROM, U disk, mobile hard disk, etc.) and includes several instructions to make a computer device (which can be a personal computer, a server, or a network device, etc.) execute the methods described in various implementation scenarios of the present application.

Based on the above firefighting method, in order to achieve the above purpose, the present disclosure further provides a physical device, which can be a personal computer, a server, a smart phone, a tablet computer, a smart watch, or other network devices, and the physical device includes a storage medium and a processor. The storage medium is used for storing a computer program; and the processor is used for executing the computer program to implement the firefighting method as described above.

Optionally, the physical device may also include a user interface, a network interface, a camera, a radiofrequency (RF) circuit, a sensor, an audio circuit, a WI-FI module, and the like. The user interface may include a display, an input unit such as a keyboard, etc., and the optional user interface may also include a USB interface, a card reader interface, etc. The network interface may optionally include a standard wired interface, a wireless interface (such as a WI-FI interface), and the like.

The storage medium may also include an operating system and a network communication module. The operating system is a program that manages the hardware of the above-mentioned physical device and software resources to be identified, and supports the operation of information processing programs and other software and/or programs to be identified. The network communication module is used to realize the communication between components in the storage medium and with other hardware and software in the information processing physical device.

The above described are only exemplary implementations of the present disclosure, and not intended to limit the protection scope of the present disclosure. The scope of the present disclosure is defined by the appended claims.

What is claimed is:

1. A fracturing device, comprising a power unit, wherein the power unit comprises a muffling compartment, a turbine engine, and a firefighting system;
   wherein the firefighting system comprises a firefighting material generator, at least one firefighting sprayer and at least one firefighting detector, the at least one firefighting sprayer and the at least one firefighting detector are located in the muffling compartment; and
   wherein each of the at least one firefighting sprayer is connected with the firefighting material generator and configured to spray out firefighting material generated by the firefighting material generator.

2. The fracturing device according to claim 1, wherein the firefighting system further comprises:
   a controller, being in a communication connection with the at least one firefighting detector and the firefighting material generator, and configured to trigger the firefighting material generator to generate the firefighting material according to information detected by the at least one firefighting detector.

3. The fracturing device according to claim 1, wherein the at least one firefighting detector comprises one or more selected from the group consisting of a temperature detector, a smoke detector, a flame detector, and a combustible gas detector.

4. The fracturing device according to claim 3, wherein the combustible gas detector comprises a methane detector.

5. The fracturing device according to claim 1, wherein the at least one firefighting detector comprises an engine temperature detector, located on a top of the muffling compartment and above the turbine engine; and
   wherein the engine temperature detector is configured to detect a temperature of the turbine engine.

6. The fracturing device according to claim 1, wherein the power unit further comprises a deceleration mechanism, the deceleration mechanism being connected with the turbine engine and located in the muffling compartment; and
   wherein the at least one firefighting detector comprises a muffling compartment temperature detector, located on a top of the muffling compartment and above the deceleration mechanism, the muffling compartment temperature detector being configured to detect a temperature of the deceleration mechanism.

7. The fracturing device according to claim 1, wherein the firefighting material generator is located outside the muffling compartment.

8. The fracturing device according to claim 1, wherein the firefighting material comprises aerosol or dry ice.

9. The fracturing device according to claim 1, wherein the firefighting system further comprises:
an alertor, configured to send out at least one of alerting sound and alerting light.

10. The fracturing device according to claim 1, wherein the firefighting system further comprises:
a hand fire extinguisher, located outside the muffling compartment.

11. The fracturing device according to claim 10, wherein the hand fire extinguisher comprises a dry powder fire extinguisher.

12. A firefighting method of a fracturing device comprising a power unit, wherein the power unit comprises a muffling compartment, a turbine engine, and a firefighting system, the firefighting system comprising a firefighting material generator, at least one firefighting sprayer and at least one firefighting detector, the method comprising:
periodically detecting firefighting information of the muffling compartment by using the at least one firefighting detector;
judging whether there is a fire in the muffling compartment according to the firefighting information; and
controlling the firefighting material generator to generate firefighting material and spraying the firefighting material through the at least one firefighting sprayer upon judging that there is a fire in the muffling compartment.

13. The firefighting method of the fracturing device according to claim 12, wherein periodically detecting the firefighting information of the muffling compartment by using the at least one firefighting detector comprises:
periodically performing temperature detection at different positions in the muffling compartment and generate a temperature data set;
periodically performing smoke concentration detection at different positions in the muffling compartment and generate a smoke concentration data set; and
periodically performing combustible gas concentration detection at different positions in the muffling compartment and a combustible gas concentration data set.

14. The firefighting method of the fracturing device according to claim 13, wherein judging whether there is a fire in the muffling compartment according to the firefighting information comprises:
in response to a temperature threshold being externally input, periodically comparing a size relationship between the temperature data set and the temperature threshold;
upon more than half of temperature values in the temperature data set being higher than the temperature threshold, judging that there is a fire in the muffling compartment; and
upon less than half of the temperature values in the temperature data set being higher than the temperature threshold, judging that there is no fire in the muffling compartment, and outputting an early warning information, wherein the first early warning information includes warning temperatures whose values are higher than the temperature threshold and detection positions of the warning temperatures.

15. The firefighting method of the fracturing device according to claim 13, wherein judging whether there is a fire in the muffling compartment according to the firefighting information further comprises:
in response to a smoke concentration threshold being externally input, periodically comparing a size relationship between the smoke concentration data set and the smoke concentration threshold;
upon more than half of smoke concentration values in the smoke concentration data set being higher than the smoke concentration threshold, judging that there is a fire in the muffling compartment; and
upon less than half of the smoke concentration values in the smoke concentration data set being higher than the smoke concentration threshold, judging that there is no fire in the muffling compartment, and outputting an early warning information, wherein the early warning information includes warning smoke concentrations whose values are higher than the smoke concentration threshold and detection positions of the warning smoke concentrations.

16. The firefighting method of the fracturing device according to claim 13, wherein judging whether there is a fire in the muffling compartment according to the firefighting information further comprises:
in response to a combustible gas concentration threshold being externally input, periodically comparing a size relationship between the combustible gas concentration data set and the combustible gas concentration threshold;
upon more than half of combustible gas concentration values in the combustible gas concentration data set being higher than the combustible gas concentration threshold, judging that there is a fire in the muffling compartment; and
upon less than half of the combustible gas concentration values in the combustible gas concentration data set being higher than the combustible gas concentration threshold, judging that there is no fire in the muffling compartment, and outputting an early warning information, wherein the early warning information includes warning combustible gas concentrations whose values are higher than the combustible gas concentration threshold and detection positions of the warning combustible gas concentrations.

17. A computer readable storage medium storing a program capable of being loaded and executed by a processor to realize the firefighting method of the fracturing device according to claim 12.

* * * * *

UNITED STATES PATENT AND TRADEMARK OFFICE
CERTIFICATE OF CORRECTION

PATENT NO. : 11,506,039 B2
APPLICATION NO. : 17/517369
DATED : November 22, 2022
INVENTOR(S) : Peng Zhang et al.

It is certified that error appears in the above-identified patent and that said Letters Patent is hereby corrected as shown below:

In the Claims

In Column 20, Claim 14, Line 1, delete "first".

Signed and Sealed this
Fourteenth Day of February, 2023

Katherine Kelly Vidal
*Director of the United States Patent and Trademark Office*